(12) United States Patent
Michelsen

(10) Patent No.: US 9,188,724 B2
(45) Date of Patent: Nov. 17, 2015

(54) IMAGE VIEWING DEVICE

(76) Inventor: Jeff A. Michelsen, Glendora, CA (US)

(*) Notice: Subject to any disclaimer, the term of this patent is extended or adjusted under 35 U.S.C. 154(b) by 726 days.

(21) Appl. No.: 13/396,219

(22) Filed: Feb. 14, 2012

(65) Prior Publication Data

US 2012/0206920 A1    Aug. 16, 2012

Related U.S. Application Data

(60) Provisional application No. 61/442,898, filed on Feb. 15, 2011.

(51) Int. Cl.
*G02B 5/08* (2006.01)
*G02B 7/182* (2006.01)
*G03C 7/14* (2006.01)
*G02B 5/32* (2006.01)
*G02B 27/02* (2006.01)

(52) U.S. Cl.
CPC .. *G02B 5/32* (2013.01); *G02B 5/08* (2013.01); *G02B 27/024* (2013.01); *G03C 7/14* (2013.01)

(58) Field of Classification Search
CPC .............. G02B 5/08; G02B 5/12; G02B 5/32; G02B 7/00; G02B 7/002; G02B 7/02; G02B 7/18; G02B 7/182; G02B 27/00; G02B 27/02; G02B 27/14; G03C 7/14; G03C 11/02

USPC ........... 359/399–430, 850–861, 630; 351/41, 351/51–52
See application file for complete search history.

(56) References Cited

U.S. PATENT DOCUMENTS

| | | | |
|---|---|---|---|
| 3,677,620 A * | 7/1972 | Bettencourt | 359/482 |
| 4,934,792 A * | 6/1990 | Tovi | 359/896 |
| 5,546,198 A | 8/1996 | van der Gracht et al. | |
| 6,220,864 B1 * | 4/2001 | Walawender | 434/236 |
| 6,452,699 B1 | 9/2002 | Athale et al. | |
| 6,474,808 B1 * | 11/2002 | Bettinger | 351/41 |
| 7,234,265 B1 * | 6/2007 | Cheng et al. | 42/113 |
| 7,646,535 B1 * | 1/2010 | Heidt | 359/428 |
| 2002/0078618 A1 * | 6/2002 | Gaber | 42/123 |
| 2007/0273823 A1 * | 11/2007 | Lee et al. | 351/52 |

* cited by examiner

*Primary Examiner* — Thong Nguyen
(74) *Attorney, Agent, or Firm* — Christie, Parker & Hale, LLP

(57) ABSTRACT

A viewing device includes an interior assembly includes an interior frame having an exterior surface, an exterior assembly coupled to the interior assembly including an exterior lens, the exterior lens having an interior surface, wherein the interior surface of the exterior lens faces the exterior surface of the interior frame. The viewing device includes a reflective surface on the exterior lens, and an object located on the interior assembly adapted to project an image onto the reflective surface. The reflective surface is configured to reflect the projected image toward the interior assembly.

17 Claims, 8 Drawing Sheets

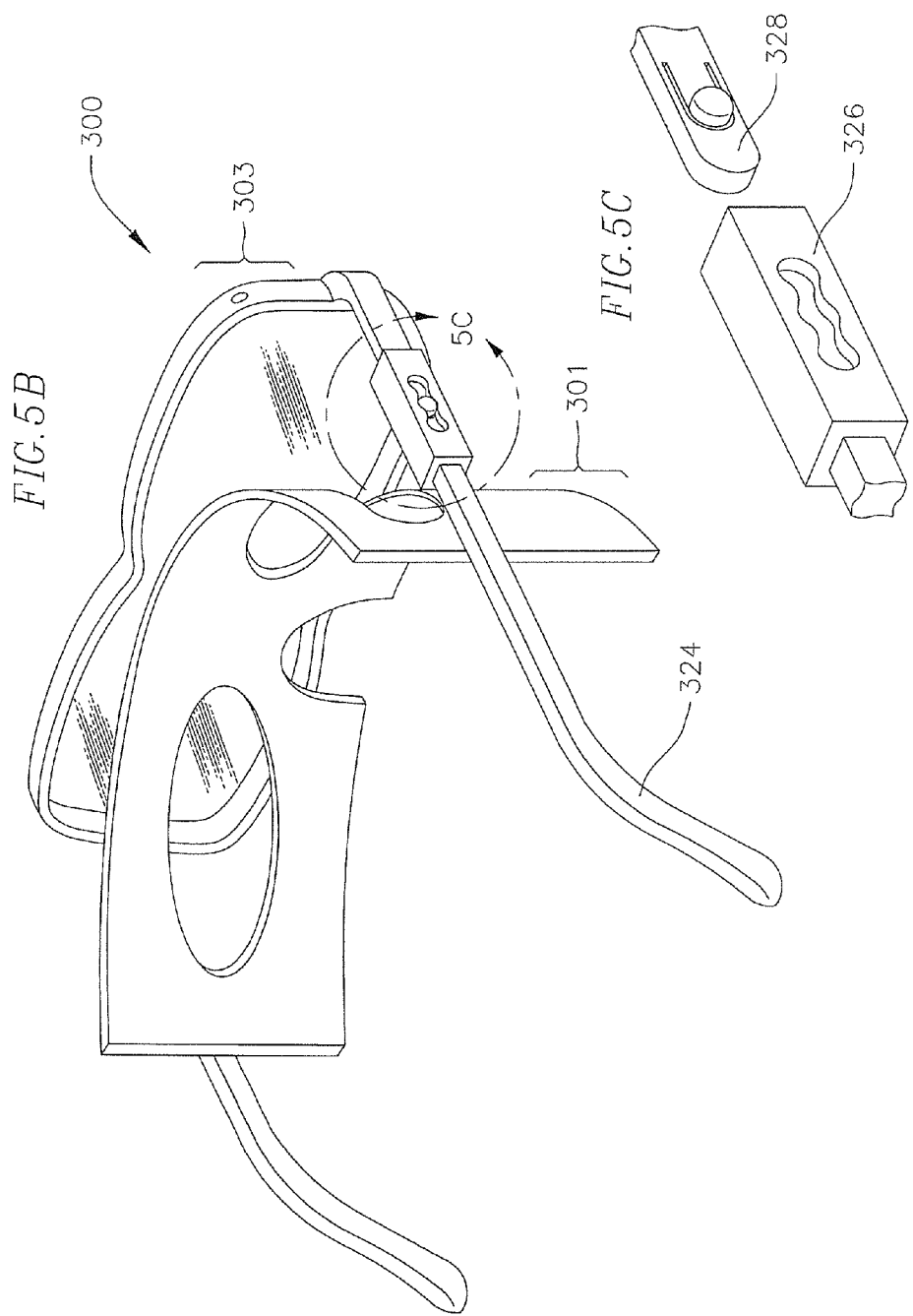

IMAGE VIEWING DEVICE

CROSS-REFERENCE TO RELATED APPLICATION

This application claims priority to and the benefit of U.S. Provisional Application No. 61/442,898, filed in the USPTO on Feb. 15, 2011, the entire disclosure of which is incorporated herein by reference.

FIELD

This disclosure relates to an image viewing device.

DISCUSSION OF RELATED ART

Viewing devices, such as glasses, may used to view images. Viewing devices may be modified so that a user sees the images differently than they would be seen by the naked eye. For example, three-dimensional (3D) glasses are oftentimes used to view 3D formatted images. For example, a child may use a pair of 3D glasses to view a decorative ornamentation that is formatted to be displayed to appear in three dimensions when viewed through the pair of 3D glasses.

One common type of 3D viewing system is a stereoscopic system. As known to one skilled in the art, stereoscopy is the enhancement of the illusion of depth in an image by presenting a slightly different image to each eye. Many different types of 3D viewing systems are stereoscopic. For example, as also known to one skilled in the art, one common type of stereoscopic system is based on anaglyph images. Anaglyph images typically are made up of two color layers, superimposed, but offset with respect to each other to produce a depth effect. When an anaglyph image is viewed with glasses having two lenses of different colors, each color corresponding to one of the image colors, such as red and cyan, the anaglyph image is filtered by each of the lenses to reveal an integrated stereoscopic image. As a result, a user viewing the anaglyph images through the glasses will perceive a three-dimensional scene or composition.

SUMMARY

Embodiments of the invention are directed to a viewing device.

According to one embodiment of the present invention, the viewing device includes an interior assembly and an exterior assembly coupled to the interior assembly. The interior assembly has an interior frame having an exterior surface. The exterior assembly includes an exterior lens. The exterior lens has an interior surface, and the interior surface of the exterior lens faces the exterior surface of the interior frame. A reflective surface is present on the exterior lens. An object is coupled to the interior assembly and is adapted to project an image onto the reflective surface. The reflective surface is configured to reflect the projected image toward the interior assembly.

The object may be adapted to project onto the reflective surface when exposed to light. The light may be an external light source or an internal light source.

The interior assembly may further include an interior lens. The object may be on the interior lens. The object may be a printed image or a reflective holographic image. The object may be uni-directionally transparent in a direction from the interior lens to the exterior lens.

A guard is present in a gap between the exterior assembly and the interior assembly. The guard may seal the gap between the exterior assembly and the interior assembly. The guard may be a diffuser.

The object may be a light source adapted to project onto the reflective surface.

The object may be adjustable to alter the projected image that is reflected toward the interior assembly.

The object may be coupled to the interior frame. The object may be a printed image or a container holding a fluid and a plurality of particles configured to move in the fluid.

The distance between the interior assembly and the exterior assembly may be adjustable.

The reflective surface may be semi-transparent.

The interior assembly may be removeably coupled to the exterior assembly.

The exterior lens may be curved.

The viewing device may be foldable to substantially eliminate the distance between the interior assembly and the exterior assembly for storage.

BRIEF DESCRIPTION OF DRAWINGS

The accompanying drawings, together with the specification, illustrate exemplary embodiments of the present invention, and, together with the description, serve to explain the principles of the present invention. In the drawings:

FIG. 5B illustrates glasses in accordance with other aspects of the present invention;

FIG. 5C illustrates an exploded view of a portion of the glasses of FIG. 5B;

DETAILED DESCRIPTION

Figure 1:
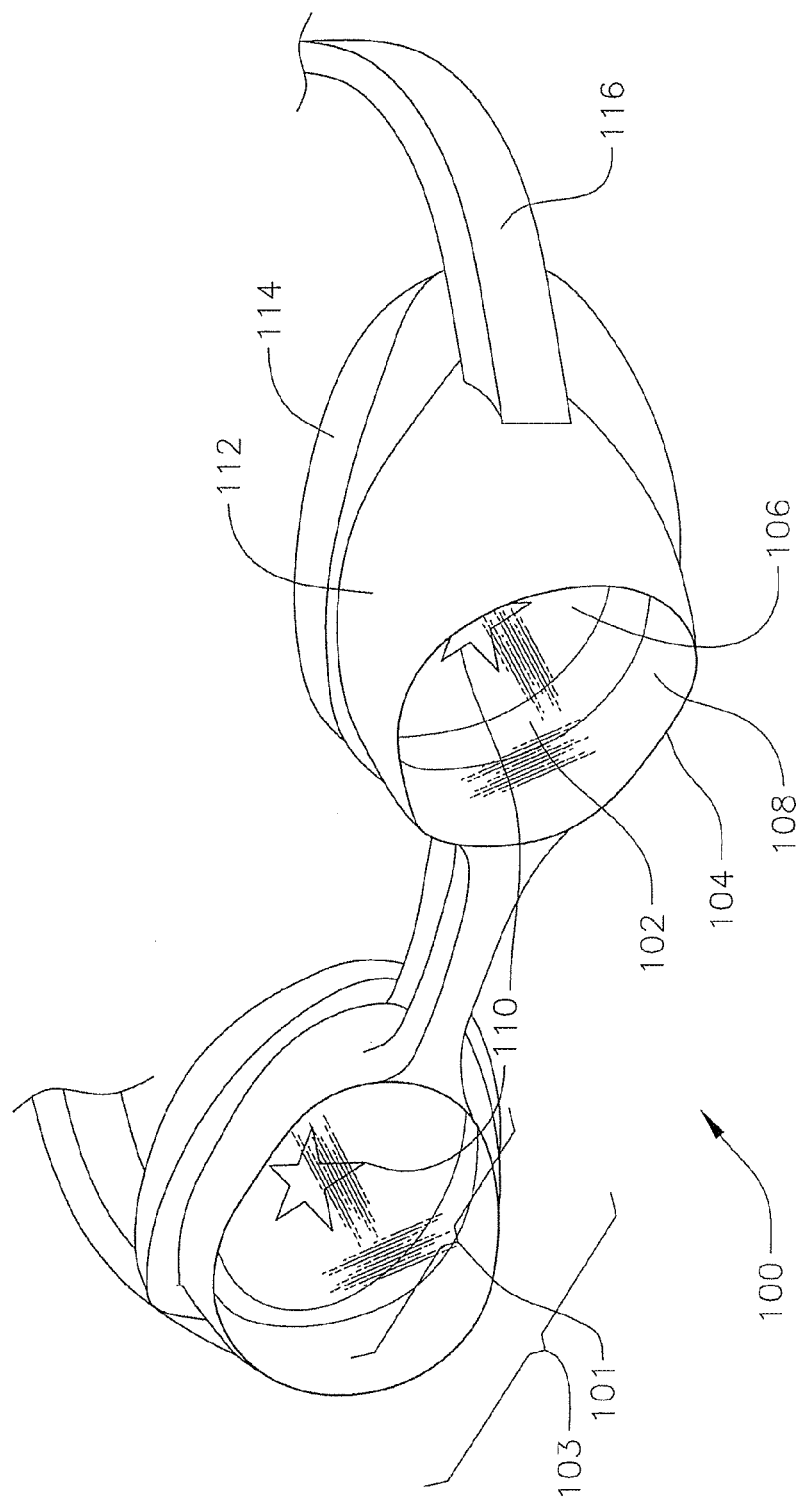
FIG. 1 illustrates a pair of goggles in accordance with aspects of the present invention.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The disclosure is capable of other embodiments and of being practiced or being carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As described above, 3D viewing systems may include stereoscopic systems utilizing glasses to view anaglyph images. However, such stereoscopic systems require that the viewed images be formatted in a specific way. For example, stereoscopic systems require that a slightly different image be presented to each eye and anaglyph based systems require that the viewed images includes two different color layers. As a result, it may be time-consuming and expensive to produce such stereoscopic and anaglyph formatted images. In addition, stereoscopic and anaglyph systems may be limited in the complexity of images they are able to display.

As described herein, viewing devices, such as glasses or goggles, having a reflective image, and not requiring the use of stereoscopic or anaglyph formatted images are provided. The viewing device includes an interior assembly including an interior frame and an exterior assembly including an exterior lens that contains a reflective surface. An object located on the interior assembly projects an image when illuminated. The projected image is reflected off the reflective surface of the exterior lens toward the interior assembly and the user's eye and is viewable by the user. This reflected image may appear to be a 3D image. When the exterior lens is semi-transparent, the reflected image is superimposed over the user's field of vision. A projected image, as described herein, occurs when an object (such as an ornamental image) is illuminated. That is, when light hits an object, some of the light is reflected, thereby projecting an image.

Figure 2:
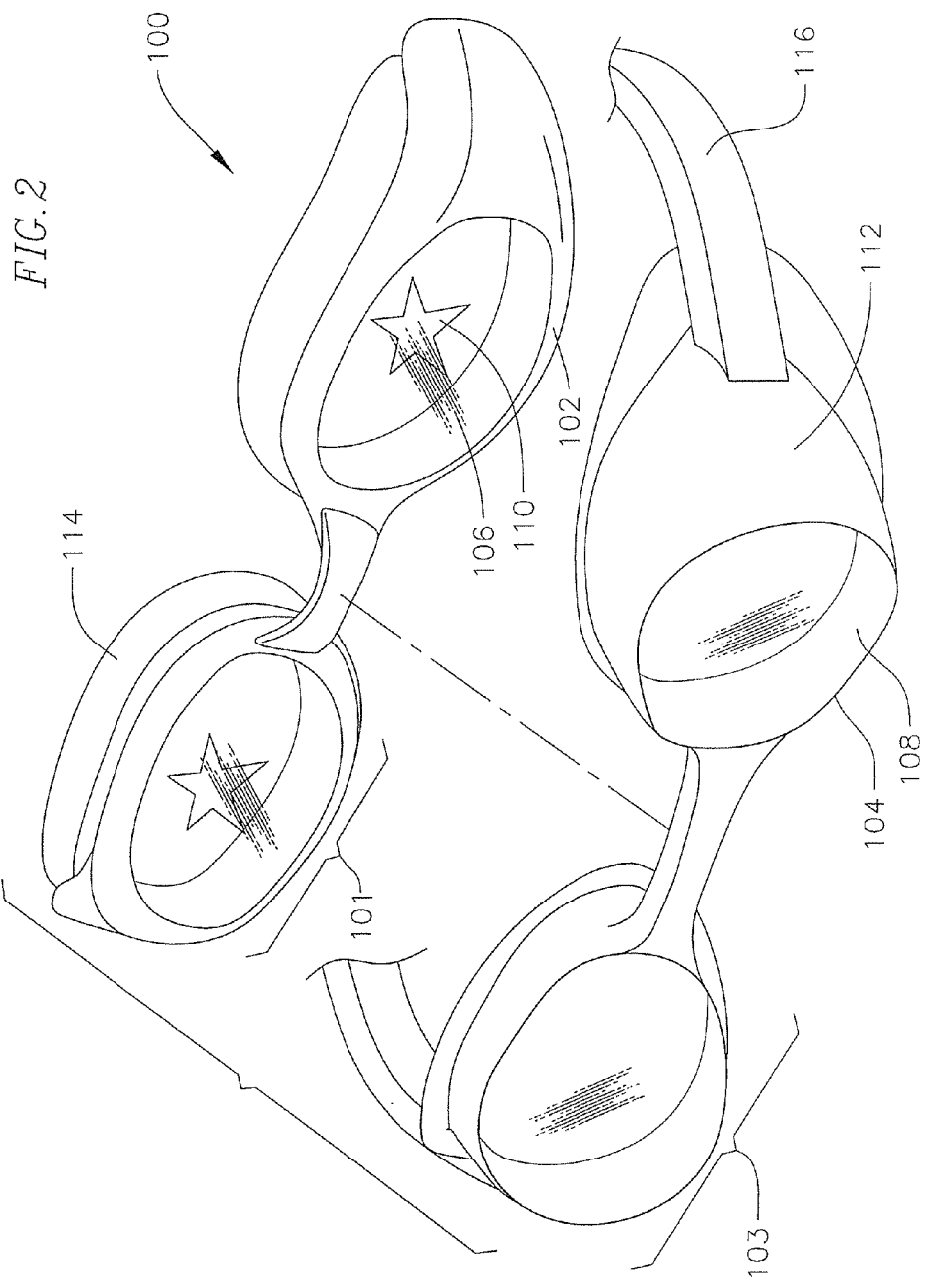
FIG. 2 is an exploded view of the goggles of FIG. 1 in accordance with aspects of the present invention.

FIG. 1 illustrates goggles 100 in accordance with aspects of the present invention. FIG. 2 illustrates an exploded view diagram of the goggles 100 in accordance with aspects of the present invention. The goggles 100 include an interior assembly 101 coupled to an exterior assembly 103. For example, the interior assembly 101 is coupled to an exterior assembly 103 via a guard 112. The interior assembly 101 includes an interior frame 102 having an external surface and a pair of interior lenses 106. The exterior assembly 103 includes a pair of exterior lenses 108 having an internal surface. The edge of the exterior lenses could be called an exterior frame 104. Alternatively, in some embodiments, a distinct exterior frame may be present. The internal surface of the exterior lenses 108 faces the exterior surface of the interior frame 102. It is to be appreciated that the interior lenses 106 and the exterior lenses 108 may be of any shape or size. The goggles include an eye cushion 114 that cushions the goggles against a user's face and a strap 116 to hold the goggles to the user's head. When viewing devices other than goggles are used, other known devices may be used to cushion the viewing devices to the user's face, such as a nosepiece. Similarly, temple arms, configured to rest on top of a user's ears and hold the viewing devices adjacent to the eyes of the user, may be used instead of a strap.

The interior lenses 106 and the exterior lenses 108 may be any suitable shape. For example, in some cases, both the interior lenses 106 and the exterior lenses 108 may be flat and oval shaped, as depicted in FIGS. 1 and 2. However, the shapes are not limited thereto. In some embodiments, one lens may be used for the interior lens and one lens may be used for the exterior lens. In some cases, one or both of the interior and exterior lens may be curved or spherical. In preferred embodiments, the interior lens may be flat. In other preferred embodiments, the exterior lens may be curved. While not being bound by any theory, it is believed that a curved exterior lens helps to focus the reflected image for a user.

According to one embodiment, the interior assembly 101 and the exterior assembly 103 are configured to allow external light to pass through the interior 106 and exterior 108 lenses. A gap may be present between the interior assembly 101 and the exterior assembly 103, and thus, the pair of interior lenses 106 and exterior lenses 108 may be separated by a distance when the assemblies are coupled together. The gap may be configured to be any appropriate size or may be eliminated entirely so that the interior lenses 106 and exterior lenses 108 are substantially adjacent to one another. In some embodiments, the gap may be 2-3 cm, ¼ to 1 in, or any other suitable gap. The gap may be adjustable as will be described with reference to FIGS. 5 and 6. Furthermore, the gap may be constant or may vary within each embodiment. That is, there may be a gradient, for example, such that the top of exterior assembly is further from the top of the interior assembly than the bottom of the exterior assembly is from the bottom of the interior assembly. Alternatively, the sides of the assemblies may be closer to each other than the center of the assemblies.

The interior 106 and exterior 108 lenses may be made of any suitable type of material, such as glass or plastic. For example, according to some embodiments, the lenses 106, 108 may be made of plastic type materials such as acrylics, polycarbonates, CR-39, or polyurethane. The interior 102 and exterior 104 frames may be made using any suitable type of material, for example, plastic materials, paper, or cardboard. As stated above, in some embodiments, the exterior frames 104 may be the edge of the exterior lenses 108. The lenses may be any suitable color, and could be clear or colored. The lenses may be coated with any suitable coating, such as an anti-scratch coating, an anti-fog coating, or any other coating that does not affect the functions described herein.

According to one embodiment, an object (e.g., an ornamental object), such as an ornamental image 110, is located on each interior lens 106. For example, in one embodiment, a hologram 110 is located on each interior lens 106. In one embodiment, each image 110 is etched into the exterior surface of each interior lens 106. In another embodiment, each image 110 is printed on a film located on the exterior surface of each interior lens 106. However, it is to be appreciated that any known method may be used to place a image 110 on each interior lens 106. Furthermore, while the ornamental image is described as being "on" each interior lens, the image could be on the interior surface or the exterior surface of each lens, an intermediate layer of each lens, or could be integrated into each lens. Furthermore, while the object is depicted as a printed image having a single star shape in FIG. 1, it is understood that any image, including pictures, drawings, patterns, or text may be used.

According to one embodiment, each ornamental image 110 on the interior lens 106 may also be uni-directionally transparent, meaning that each image 110 may be viewed from only one direction. For example, in one embodiment, each image 110 is configured so that the image 110 may be viewed only from points located on the exterior side of the interior lens 106. A user, looking toward an interior side of the interior lens 106 (opposite the exterior side) would be unable to directly view the image 110. Rather, as described herein, a user will be able to see the image 110 only by viewing its reflection from the exterior lens 108. In some embodiments, the image is a hologram, such as a reflection hologram, which can generally be seen only on the same side as a light source, i.e., on the exterior side of the interior lens. However, in embodiments of the invention, the reflection hologram is further reflected off the exterior lens 108, and thus, it may be seen by the user. In other embodiments, the image is a printed semi-transparent image. When the image is on an interior lens 106, it is too close to the eye to be in focus. However, because the illuminated image is reflected off the exterior lens 108 back toward the user, it may be seen by the user. In other embodiments, while the entirety of the hologram or image may not be viewable by the user, a portion of it may be viewable by the user.

According to one embodiment, the ornamental images 110 on each lens 106 may be the same; however, in other embodiments, the ornamental images 110 on each lens 106 may be different, or the ornamental image may only be present on one lens 106. According to another embodiment, where the ornamental images 110 are holograms, at least one hologram 110 may be configured to display a first image when viewed from a first position and a second image when viewed from a second position. For example, a hologram 110 printed or etched on the exterior surface of an interior lens 106 may be configured to project a first image when exposed to external light from a first position and to project a second image when exposed to external light from a second position. In such an embodiment, a change in external light may be caused by a user of the goggles 100 moving his/her head or moving the position of the goggles 100 themselves. The hologram 110 may be configured to display more or fewer than two different images and are not restricted to providing slightly offsetting images to each eye (e.g., as required with stereoscopic or anaglyph images). In some embodiments, the inner lens can be tinted and/or polarized, as doing so may allow the user to view the image more clearly and more vividly.

According to one embodiment, each exterior lens 108 includes a reflective surface located on at least a portion of the lens 108. For example, in one embodiment, an optical coating (e.g., a mirror or flash coating) may be applied to the interior surface of each lens 108 to form the reflective surface. In another embodiment, the reflective surface may comprise a thin layer of reflective film deposited on the interior surface of each lens 108. In another embodiment, the interior surface of each exterior lens 108 is polished to create an inner reflective surface. However, any known material or methods may be used to create a reflective surface as long as the exterior lens 108 is configured to reflect images projected from the interior assembly 101 back through the lens 106 of the interior assembly. According to one embodiment, despite being reflective, the inner reflective surface of each exterior lens 108 is also semi-transparent, allowing a user to see through the exterior lens 108. In other embodiments, the exterior lens 108 is opaque such that a user is unable to see past the exterior lens 108.

The guard 112 may connect the exterior assembly 103 to the interior assembly 101. The guard 112 may seal the area between the exterior assembly 103 and the interior assembly. By sealing the space between the two assemblies, no dirt, dust, moisture, air, or liquids may enter the gap, and thus, the gap may be substantially dirt, dust, moisture, air, and liquid free, enabling clearer vision. In some embodiments, a vacuum is present in the space between the two assemblies, while in other embodiments, an inert gas or substantially moisture-free gas is present in the sealed space between the assemblies. In other embodiments, the guard 112 does not seal the structure. In some embodiments, the guard is a diffuser, a light blocker, or a light magnifier. In some embodiments, the guard 112 (which could be flat, angled, irregularly shaped, or have any suitable design) may be configured to allow external light to pass through the gap between the assemblies 101, 103, thereby admitting more light to the device 100. For example, the guard 112 may be substantially transparent. In other embodiments, the guard 112 may be a diffuser that more evenly spreads external light into the gap, such as a frosted lens. The diffuser may also be designed to angle light so that it is directed to the object to reflect more light off the object. In other embodiments, the guard 112 may aid in reflecting light that is already present inside the gap, i.e., light that is present in the gap as a result of an internal light source or external light that entered the assembly through the exterior lens 108. In other embodiments, the guard 112 may be substantially opaque, preventing light from entering the space around the gap. In other embodiments, the guard 112 may magnify the light so that the amount of light entering the gap is multiplied or intensified. In still other embodiments, the guard 112 may be colored to modify the colors that the user will see.

Figure 3:
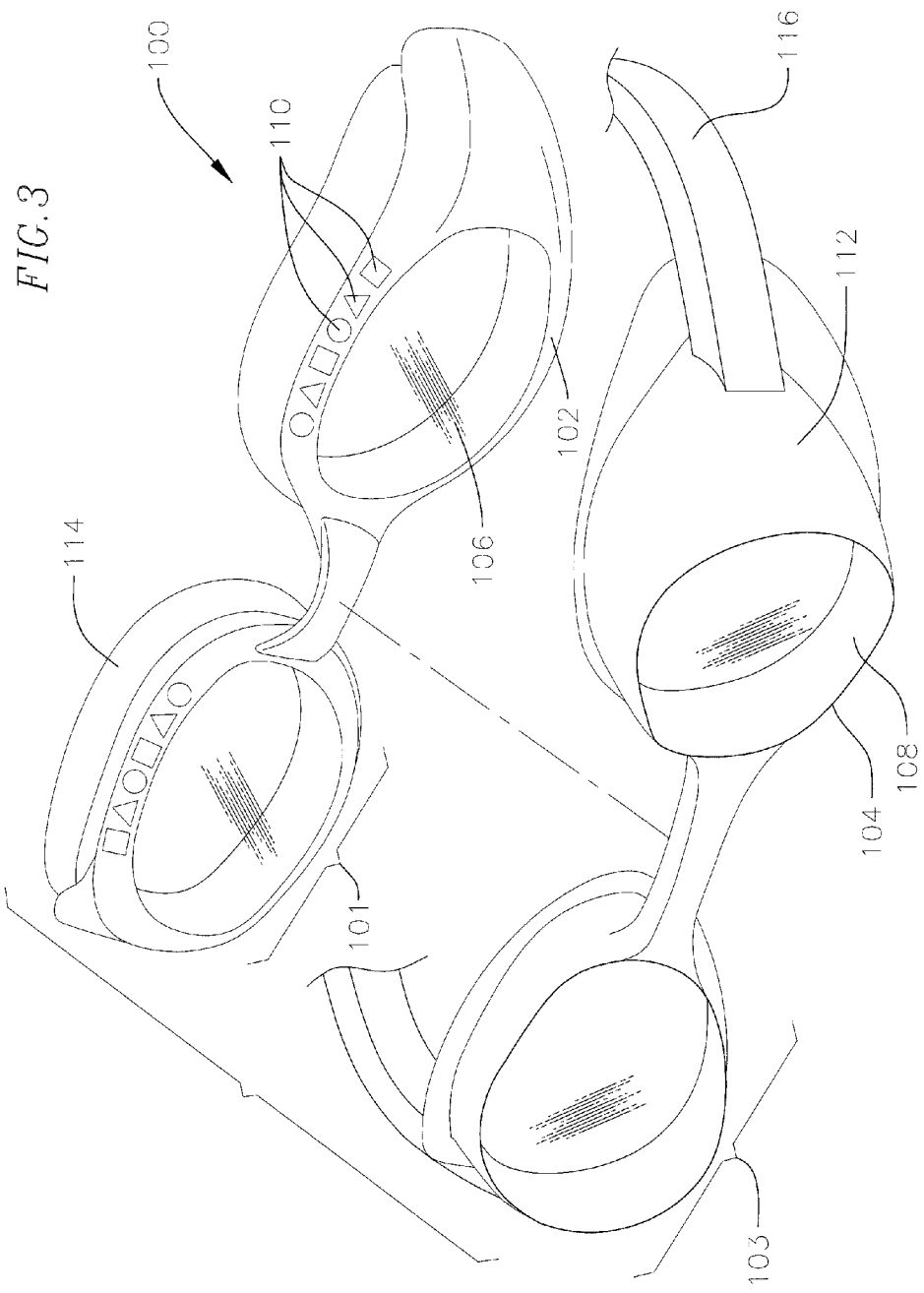
FIG. 3 illustrates an exploded view of goggles in accordance with aspects of the present invention.

FIG. 3 illustrates an exploded view diagram of the goggles 100 in accordance with another embodiment of the present invention. The goggles 100 are substantially the same as the goggles 100 discussed in relation to FIGS. 1-2, however, instead of including an object 110 on the interior lens 106, the goggles 100 include at least one object 110 on the interior frame 102. Just as with FIGS. 1-2, the interior assembly 101 includes an interior frame 102 and a pair of interior lenses 106. The exterior assembly 103 includes an exterior frame 104 (i.e., an edge of the lenses) and a pair of exterior lenses 108. The goggles 100 include an eye cushion 114 that cushions the goggles against a user's face and a strap 116 to hold the goggles to the user's head. An ornamental image 110, is located on the interior frame 102. As shown in FIG. 3 the object 110 is a printed image, e.g., a plurality of shapes, printed on the interior frame 102. The object 110 can be printed on the interior frame 102 or can be integrated into the frame 102. However, it is to be appreciated that any known method may be used to place an image 110 on the interior frame 102. As with the embodiment described above, when exposed to light, the shapes project an image that reflects off the reflective surface of the exterior assembly 103 back through the interior lens 106.

The operation of the viewing device 100 of FIG. 1 will now be described with reference to FIG. 4. As the viewing device 100 is exposed to an external light source 170 (i.e., a source of light that is external to the viewing device e.g., daylight, artificial light, reflected light etc.), the light causes an image (in this instance, a reflection hologram) 110 on the exterior surface 201 of the interior lens 106 to project a holographic image 208 onto the inner reflective surface 202 located on the interior surface 203 of the exterior lens 108. According to one embodiment, the holographic image 208 projects across a gap 206 to the reflective surface 202.

As discussed above, according to one embodiment, the hologram 110 may be configured to project more than one holographic image 208 onto the reflective surface 202, depending on the external light to which the hologram 110 is exposed. For example, in one embodiment, the hologram 110 may project a first image onto the reflective surface 202 when a user of the device 100 is looking in a first direction (i.e., the hologram 110 is exposed to external light from the first direction) and the hologram 110 may project a second image onto the inner reflective surface 202 when the user of the goggles 100 is looking in a second direction (i.e., the hologram 110 is exposed to external light from the second direction). Thus, in such an embodiment, by moving his/her head (i.e. changing the angle by which external light is hitting the hologram 110), a user of the goggles 100 is able to control which holographic image 208 is projected onto the inner reflective surface 202.

The reflective surface 202 reflects the projected holographic image 208 back towards the interior lens 106. A user 204, looking toward the interior surface 205 of the interior lens 106, will see the reflected holographic image 210 through the interior surface 205 of the interior lens 106. According to one embodiment, due to the holographic image 210 being reflected back to the user 204, an illusion of depth is created and the holographic image 210 may appear as a transparent 3D holographic image. In addition to viewing the holographic image; due to the semi-transparent nature of the inner reflective surface 202, the user will still be able to see through the exterior lens 108.

Figure 4:
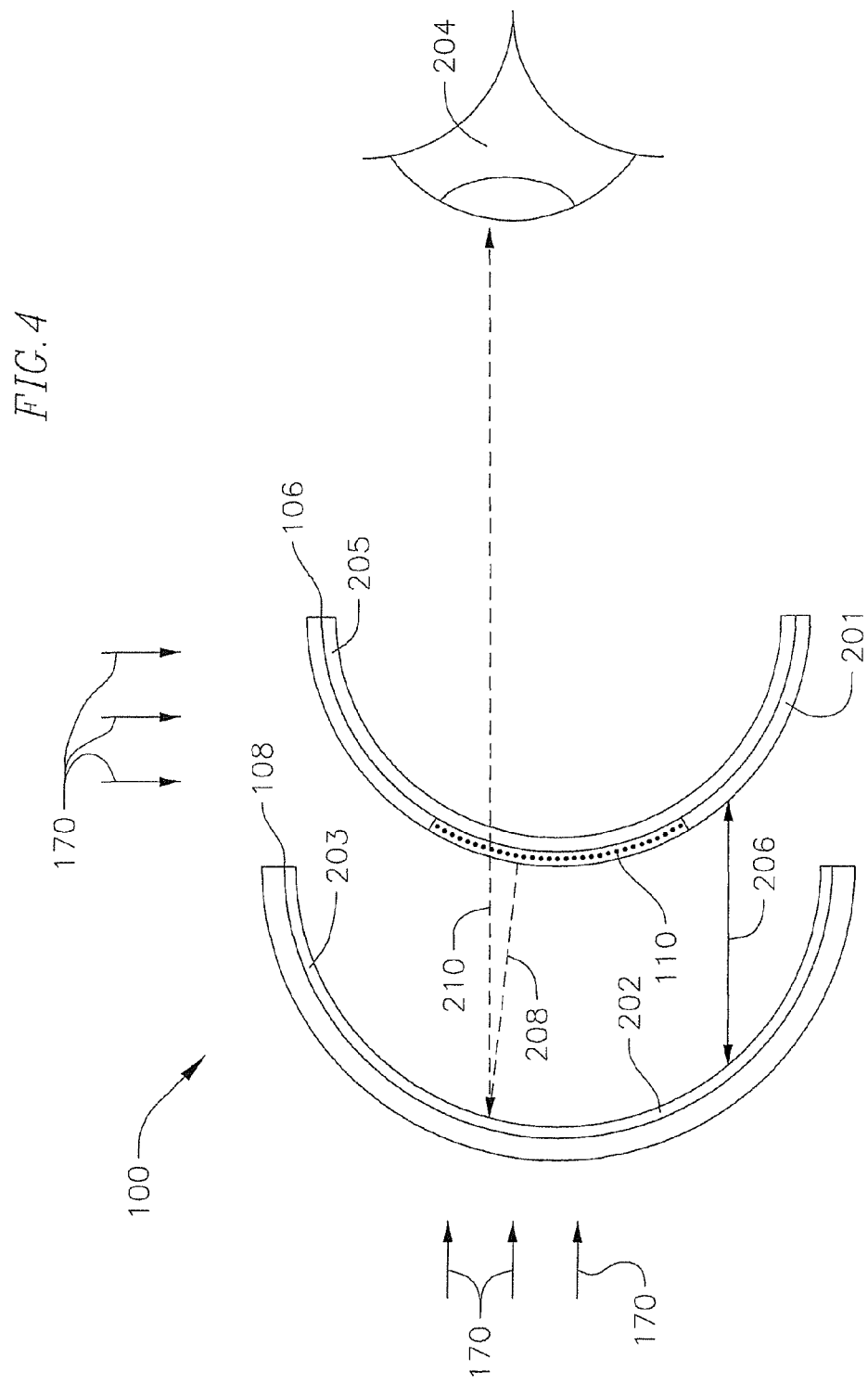
FIG. 4 is an exploded view diagram of a viewing device in accordance with aspects of the present invention.

As shown in FIG. 4, the interior lens 106 and the exterior lens 108 are substantially parallel to one another. However, it is to be appreciated that the interior lens 106 and the exterior lens 108 may be configured differently in relation to each other. For example, in one embodiment, the interior lens 106 may be positioned in such a way so as to project an image onto the exterior lens 108 at a desired angle, when external light hits the angled interior lens 106. Also, as mentioned above, the interior lenses 106 and the exterior lenses 108 may be of any shape or size.

It is to be appreciated that as the holographic images are reflected back to the user 204, without the need for filtering through two-tone glasses (e.g., as with anaglyph stereoscopic images), the hologram may be viewed over the full spectrum of color and is not limited by the color of the lenses.

Also, according to one embodiment, the holograms 110 may be intended to be viewed in a specific orientation (e.g., with alphanumeric characters). In such a situation, the holograms 110 may be configured on the exterior surface 201 of the interior lens 106 in a backwards configuration so that when the projected holographic image 208 is reflected off of the inner reflective surface 202, the resulting reflected holographic image 210 is flipped and appears to a user in the correct orientation.

As described above, the interior lens 106 may include holograms 110. However, according to other embodiments, objects 110 may be non-holographic images. Such non-holographic images may be projected onto the exterior lens 108 and reflected back to the interior lens 106 by the reflective surface 202 to produce an image, as discussed above. As discussed above, the object 110 may be located on the interior lens 106 or the interior frame 102. In some embodiments, the object may be embedded in the interior frame 102, while in other embodiments, the object may be affixed to the interior frame 102. Objects other than ornamental images may also be used to project an image when exposed to light. For example, a snow-globe type tube may be affixed to or embedded in the interior frame 102. A snow-globe type tube is a container of any suitable shape, such as a cylinder, filled with particles or flakes of any variety of shapes, sizes, and colors, that float in a fluid, such as a viscous fluid. For example, in some embodiments, the particles or flakes may be multi-colored glitter-like shapes, such as glittery animals, star shapes, heart shapes, or any other suitable type of particle. In one embodiment, the particles may be phosphorescent, glow-in-the-dark materials. When light hits the snow-globe type tube (or is generated by the phosphorescent particles in the tube), the particles or flakes project an image to the reflective surface 202, which is then reflected back to the interior lens 106 to produce a transparent image. Any object that is capable of creating an image when exposed to light (or when illuminated by internal light) and reflected off the reflective surface 202 to produce an image may be used.

Figure 5A:
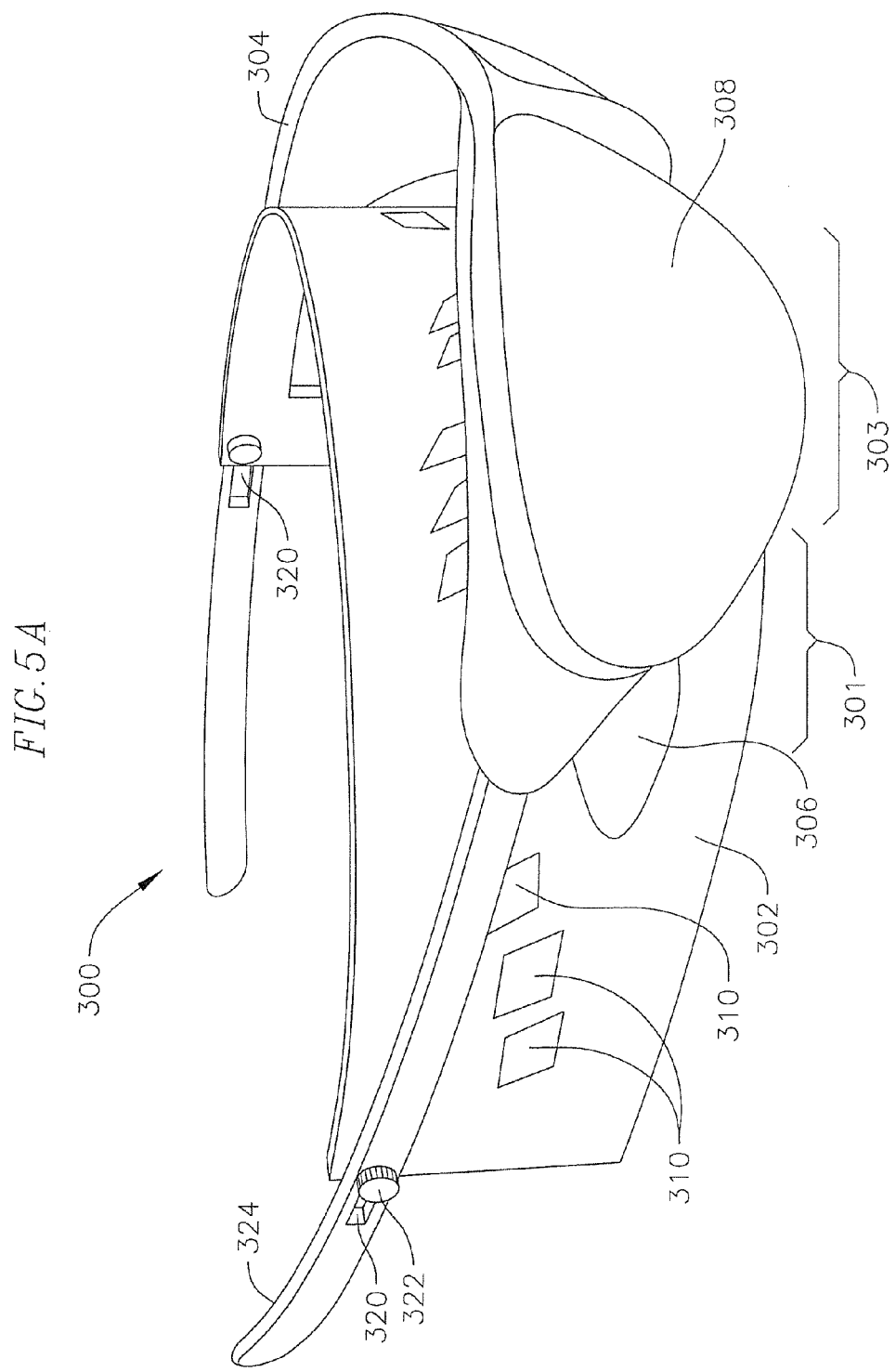
FIG. 5A illustrates glasses in accordance with aspects of the present invention.

FIG. 5A depicts glasses 300 in accordance with aspects of the present invention. The glasses 300 include an interior assembly 301 coupled to an exterior assembly 303 and temple arms 324. The interior assembly 301 includes an interior frame 302, however, the interior assembly 301 does not include lenses. That is, an opening 306 (e.g., an eye hole or a slit) is located in the interior frame 302 through which a user can view the exterior lens 308. The exterior assembly 303 includes an exterior frame 304 and exterior lenses 308. The exterior lenses 308 include a reflective surface on an interior surface of the exterior lenses 308. A plurality of ornamental images 310 are located on the interior frame 302. The ornamental images 310 located on the interior frame 302 are projected onto the exterior lens 308 (when exposed to light) of the outer frame 304 and reflected back to the user, through the eye holes 306, to produce a transparent image viewable by the user.

FIG. 5A also depicts an embodiment where the gap (i.e., distance) between the interior assembly 301 and exterior assembly 303 is adjustable. That is, the interior assembly 301 is fixed to the exterior assembly 303 by a fastener, such as a bolt and nut 322. The temple alms 324 include a slit 320 in which a bolt extends through the temple arm 324. When the nut 322 is loosened, the interior assembly 301 may be moveable with respect to the exterior assembly 303. The nut 322 can be tightened when an appropriate distance is present between the interior assembly 301 and the exterior assembly 303 to fix the assembly. The benefits of the adjustable gap is, at least in part, to improve the fit for the user and to allow the user to adjust the focal point so that the reflected image is viewable by the user with or without additional corrective eyewear (glasses or contacts). In addition, by adjusting the gap between the assemblies, the viewer can adjust the device so that the images reflect off the exterior lens at different angles.

FIG. 5B depicts another embodiment of a viewing device according to the present invention and FIG. 5C is an exploded view of a portion of FIG. 5B. The interior assembly 301 is fixed to the exterior assembly 303 by a tab 328 and a lock 326. The lock 326 contains a number of openings in which the tab 328 may be seated. When the tab 328 is seated in one of the openings, friction secures the tab 328 and the lock 326 to fix the interior assembly 301 to the exterior assembly 303. The tab 328 may be moved to another of the openings in the lock 326 to adjust the distance between the interior assembly 326 and the exterior assembly 328, thereby allowing the user to adjust the distance between the interior assembly 301 and the exterior assembly 303.

Figure 6:
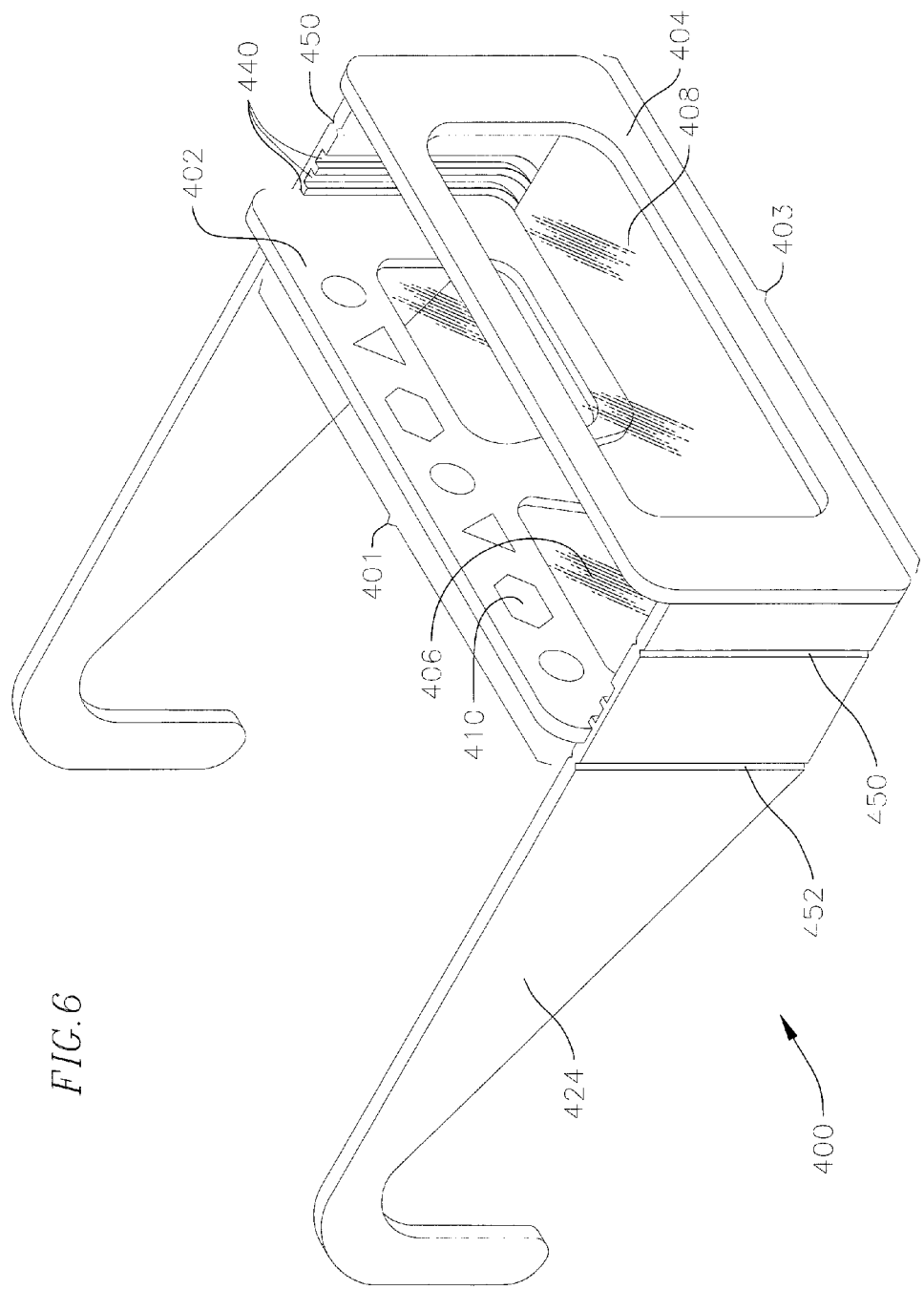
FIG. 6 illustrates paper glasses in accordance with aspects of the present invention.

FIG. 6 depicts glasses 400 according to another embodiment of the present invention. The glasses 400 include an interior assembly 401 coupled to an exterior assembly 403 and temple arms 424. The interior assembly 401 includes an interior frame 402 and interior lenses 406. The exterior assembly 403 includes an exterior frame 404 and a single exterior lens 408. The exterior lens 408 include a reflective surface on an interior surface of the exterior lens 308 (however, the reflective surface may be on any portion of the exterior lenses 308 as long as it is capable of reflecting light back toward the interior assembly 401. The exterior lens 408 may be a single flat lens, as depicted in FIG. 6, or alternatively, the exterior lens 408 may be curved. A plurality of ornamental images 410 are located on an external surface of the interior frame 402. The ornamental images 410 located on the interior frame 402 are projected onto the exterior lens 408 (when exposed to light) of the outer frame 404 and reflected back to the user, through the lens 406, to produce an image viewable by the user. In addition, the interior assembly 401 is removable and replaceable. That is, the interior assembly 401 may be removed and replaced with other interior assemblies having different lenses, no lenses, and interior assemblies that project a different image. Furthermore, the viewing device includes a plurality of slots 440 into which the interior assembly 401 may be placed to adjust the distance between the interior assembly 401 and the exterior assembly 403.

The glasses 400 of FIG. 6 are made of paper. However, as stated above, the frames may be made of any suitable material, such as plastic or cardboard. The glasses 400 may also be folded such that they are substantially flat. That is, a bend (e.g., a crease or score) 450 present on both sides of the exterior assembly 403, allows the exterior assembly 403 to be collapsed so that it is substantially adjacent to the interior assembly 401. A bend 452 is also present at the junction of the interior assembly 401 and the temple arms 424 so that the temple arms may be folded to be adjacent to the interior assembly 401. As such, the glasses 400 may be folded to be substantially flat so that they are easier to transport and store. In some embodiments, the glasses may fold so that they are substantially flat as described above, however, in other embodiments, the glasses may be not be completely collapsible. That is, the arms may be configured to fold against the interior assembly, but the distance between the interior and exterior assembly may be fixed. Alternatively, the exterior assembly may be partially foldable against the interior assembly, such that while it is not substantially flat against the interior assembly, the assemblies are compacted when folded.

Figure 7:
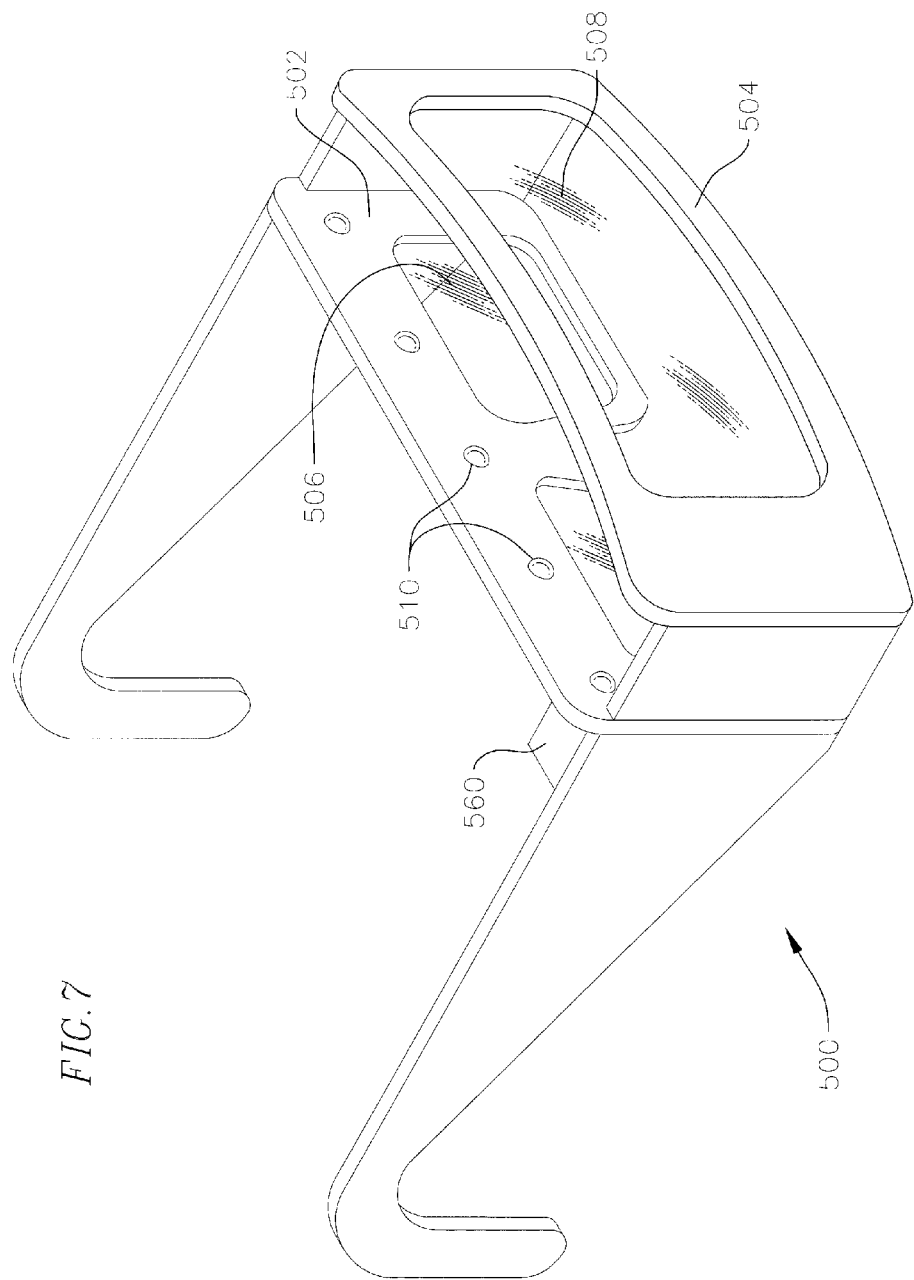
FIG. 7 illustrates paper glasses in accordance with another aspect of the present invention.

FIG. 7 depicts glasses 500 according to another embodiment of the present invention. The glasses 500 are similar to glasses 400 depicted in FIG. 6. Unlike the glasses of FIG. 6, the single exterior lens 508 (and the exterior frame 504) is curved. The glasses 500 include a plurality of LED lights 510 affixed to the interior frame 502. When powered, the LED lights 510 are projected onto the exterior lens 508 of the outer frame 504 and reflected back to the user, through the lens 506, to produce an image that is superimposed over the user's field of view. The LED lights 510 may be powered by a small battery pack 560. The battery pack 560 may be connected to the LED lights 510 via wiring. Alternatively, the battery pack 560 may be replaced with any suitable power source, such as a small solar panel. The solar panel could be directly connected to the LED lights 510, or the solar panel could charge a battery that may then, e.g., be switched on to power the LED lights 510. While LED lights 510 are described as the object which is reflected back to the user, any light source or electronic image could be used. For example, a photograph placed on the interior frame 502 could be back-lit so that it serves as both the object and a light source. Alternatively, a glow in the dark object could be located on the interior frame 502, such that when it is glowing it may be reflected.

Alternatively, the glasses could include an internal light source, which illuminates an object (e.g., an ornamental image), projecting an image to the exterior lens 508. The image may then be reflected back to the user. An internal light source, whether it is integrated into the object to be reflected or not, is beneficial in that the viewing device may be used even in low lighting conditions. The light source could be a plurality of LED lights, a plurality of small lights, a light bar, fiber optic lights, a glow-in-the-dark light strip, or any suitable light source. The light source could be fixed to any suitable part of the device, including the interior assembly or the exterior assembly.

While the objects have been described as being fixed, it will be understood that the objects (i.e., the ornamental image or hologram) may be replaceable, moveable, or adjustable. For example, in an embodiment, the images are on the interior lens, and the lens may be rotatable within the interior assembly. The interior lens may be larger than the user's field of vision. Accordingly, when the interior lens is rotated, the image that is in the user's field of vision may be changed. Alternatively, the interior lens may be removably coupled to the interior frame, and thus, the images printed on the lens may be replaced with lenses having different images. Similarly, the interior frame may be moveable (e.g., the frame may be rotated, the frame may be slid within the device, the frame may be put upside down, or the frame may be turned around), or alternatively, the object on the interior frame may be moveable or adjustable. For example, the object could be a roll of images affixed to the interior frame, where the roll is transferred from one spool to another. The roll could be controlled by a power source, or alternatively, the roll could be controlled by a manual adjustor, such as a crank. Other embodiments with moveable or adjustable objects could be used.

As described herein, the current system may be implemented using one lens (exterior lenses 108 only), two lenses (i.e., interior lens 106 and exterior lens 108), or three lenses (i.e., interior lens 106, exterior lens 108, and an additional lens located in the system, e.g., between the interior and exterior lens). Furthermore, each of the interior lens 106 and exterior lens 108 may include two or more lenses, e.g., one for each eye. In this way, any number of inner frames 102 including different ornamental images 110 may be coupled to the exterior frame 104.

As described herein, the current system may be implemented in glasses or goggles. However, it is to be appreciated that the current system may be implemented in any type of viewing device or system.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicants' intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A viewing device comprising:
   an interior assembly comprising at least one interior lens and an interior frame having an exterior surface;
   an exterior assembly coupled to the interior assembly, the exterior assembly comprising an exterior lens, the exterior lens having an interior surface, wherein the interior surface of the exterior lens faces the exterior surface of the interior frame;
   a reflective surface on the exterior lens; and
   an object on the at least one interior lens of the interior assembly adapted to project an image onto the reflective surface,
   wherein the reflective surface is configured to reflect the projected image toward the interior assembly.

2. The viewing device of claim 1, wherein the object is adapted to project onto the reflective surface when exposed to light.

3. The viewing device of claim 2, wherein the light is an external light source or an internal light source.

4. The viewing device of claim 1, wherein the object is a printed image or a reflective holographic image.

5. The viewing device of claim 1, wherein the object is uni-directionally transparent in a direction from the interior lens to the exterior lens.

6. The viewing device of claim 1, wherein a guard is present in a gap between the exterior assembly and the interior assembly.

7. The viewing device of claim 6, wherein the guard seals the gap between the exterior assembly and the interior assembly.

8. The viewing device of claim 6, wherein the guard is a diffuser.

9. The viewing device of claim 1, wherein the object is a light source adapted to project onto the reflective surface.

10. The viewing device of claim 1, wherein the interior assembly is adjustable to alter the projected image that is reflected toward the interior assembly.

11. The viewing device of claim 1, further comprising a second object coupled to the interior frame.

12. The viewing device of claim 1, wherein a distance between the interior assembly and the exterior assembly is adjustable.

13. The viewing device of claim 1, wherein the reflective surface is semi-transparent.

14. The viewing device of claim 1, wherein the interior assembly is removeably coupled to the exterior assembly.

15. The viewing device of claim 1, wherein the viewing device is foldable to substantially eliminate a distance between the interior assembly and the exterior assembly for storage.

16. The viewing device of claim 1, wherein the exterior lens is curved.

17. A viewing device comprising:
an interior assembly comprising at least one interior lens and an interior frame having an exterior surface;
an exterior assembly coupled to the interior assembly, the exterior assembly comprising an exterior frame and an exterior lens, the exterior lens being curved and having an interior surface, wherein the interior surface of the exterior lens faces the exterior surface of the interior frame;
a reflective surface on the exterior lens; and
an object comprising a printed image on the at least one interior lens of the interior assembly adapted to project an image onto the reflective surface,
wherein the reflective surface is configured to reflect the projected image toward the interior assembly, wherein a distance between the interior assembly and the exterior assembly is adjustable, wherein the interior frames and the exterior frames comprise paper, and wherein the viewing device is foldable to substantially eliminate the distance between the interior assembly and the exterior assembly for storage.

\* \* \* \* \*